United States Patent
Grosse et al.

(10) Patent No.: US 9,727,044 B2
(45) Date of Patent: Aug. 8, 2017

(54) METHOD AND CONFIGURATION ENVIRONMENT FOR SUPPORTING THE CONFIGURATION OF AN INTERFACE BETWEEN SIMULATION HARDWARE AND AN EXTERNAL DEVICE

(75) Inventors: Lars Grosse, Boffzen (DE); Martin Kronmueller, Salzkotten (DE); Holger Naundorf, Paderborn (DE); Matthias Schwarz, Paderborn (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 906 days.

(21) Appl. No.: 13/524,696

(22) Filed: Jun. 15, 2012

(65) Prior Publication Data

US 2013/0338801 A1 Dec. 19, 2013

(51) Int. Cl.
*G05B 19/042* (2006.01)
*G06F 17/50* (2006.01)

(52) U.S. Cl.
CPC ..... *G05B 19/0426* (2013.01); *G06F 17/5009* (2013.01); *G05B 2219/21086* (2013.01); *G05B 2219/23258* (2013.01); *G05B 2219/23446* (2013.01); *G05B 2219/25067* (2013.01); *G06F 2217/86* (2013.01)

(58) Field of Classification Search
CPC ...... G05B 9/02; G05B 23/02; G05B 23/0205; G05B 23/0216; G05B 23/0218; G06F 11/327
See application file for complete search history.

(56) References Cited

U.S. PATENT DOCUMENTS

2003/0132962 A1* 7/2003 Santori ................. G06F 9/4443
715/762
2007/0067062 A1* 3/2007 Mairs et al. ................. 700/275
(Continued)

OTHER PUBLICATIONS

Peng Xu, A Simulation-Based Testing and Training Environment for Building Controls, Aug. 4-6, 2004, Proc. SimBuild 2004, Building Sustainability and Performance Through Simulation, http://simulationresearch.lbl.gov/dirpubs/04_peng.pdf.*
(Continued)

*Primary Examiner* — Nathan L Laughlin
(74) *Attorney, Agent, or Firm* — Muncy, Geissler, Olds & Lowe, P.C.

(57) ABSTRACT

A method for supporting a configuration of an interface is provided, wherein the configuration environment has an overview region that has several subregions. At least one item of information concerning a part of the configuration is displayed in each subregion. For each subregion, an item of information concerning the part of the configuration associated with the subregion is displayed. In the case of a warning and/or error message, a configuration option is displayed so as to be selectable, via which the warning/error message is resolved. The selection of the displayed configuration option causes a functionality to be started via which the displayed configuration option is made possible. In the case of a change in the status of a subregion, the display of the status and/or warning and/or error message and a configuration option derived therefrom in one subregion or several subregions is automatically updated and adapted to the changed status.

20 Claims, 5 Drawing Sheets

(56) References Cited

U.S. PATENT DOCUMENTS

2008/0077382 A1\* 3/2008 Strehl ................ G06F 17/5022
                                                            703/20
2008/0175210 A1\* 7/2008 Jamieson ...................... 370/338
2010/0070086 A1\* 3/2010 Harrod et al. ................ 700/276
2010/0107074 A1\* 4/2010 Pavlak et al. ................. 715/702
2011/0029102 A1\* 2/2011 Campney et al. ............. 700/83

OTHER PUBLICATIONS

"ConfigurationDesk"; New Workflow Flexibility; dSPACE Magazine Feb. 2011.
SCALEXIO® New Technology for HIL Simulation;Copyright 2011 by Dspace GmbH.
RapidPro Hardware; Copyright 2011 by Dspace GmbH.
AQtime 6 User Manual Copyright 1998-2008 by AutomatedQA Corporation.

\* cited by examiner

METHOD AND CONFIGURATION ENVIRONMENT FOR SUPPORTING THE CONFIGURATION OF AN INTERFACE BETWEEN SIMULATION HARDWARE AND AN EXTERNAL DEVICE

BACKGROUND OF THE INVENTION

Field of the Invention

The invention relates to a method and a configuration environment for computer-assisted configuration of an interface between simulation hardware and an external device. A configuration environment of this nature has a display device, an input device, and a storage device for storing a database.

Description of the Background Art

Figure 5:
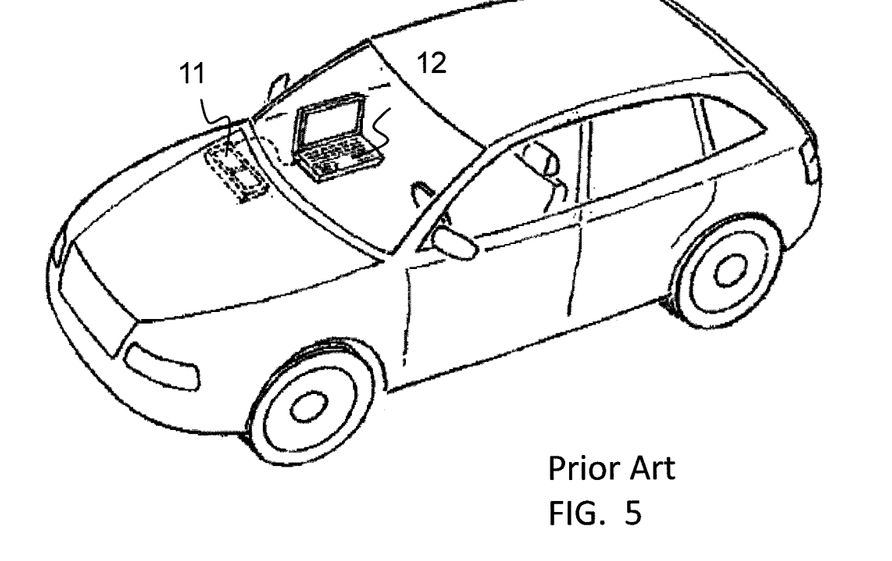
FIG. 5 is a schematic view of rapid prototyping in a control system of a vehicle in accordance with the prior art.
Figure 6:
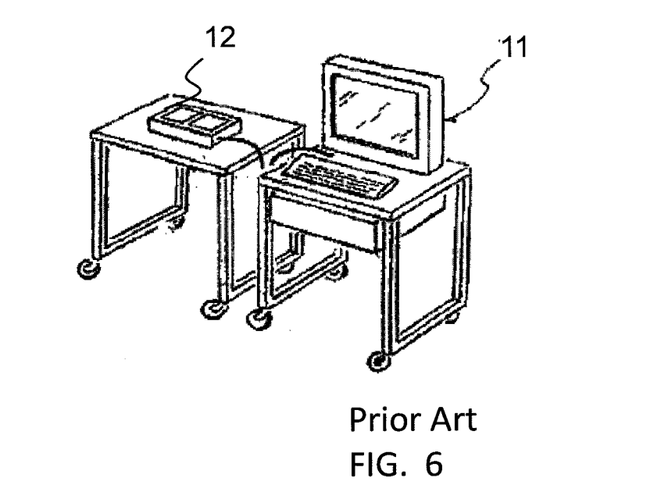
FIG. 6 is a schematic view of a hardware-in-the-loop structure in accordance with the prior art.
Figure 7:
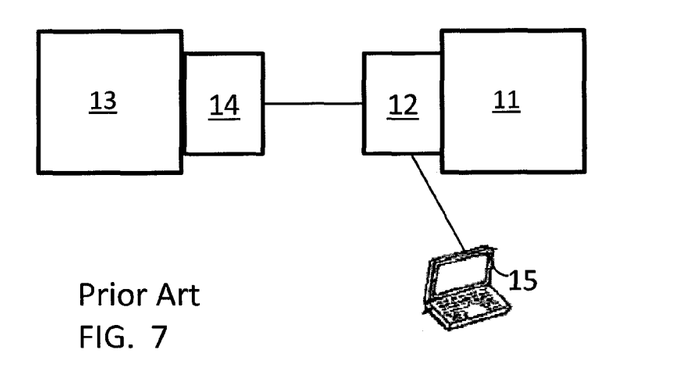
FIG. 7 is a schematic view of the structure for configuration of the interface of the control system in accordance with the prior art.
Figure 8:
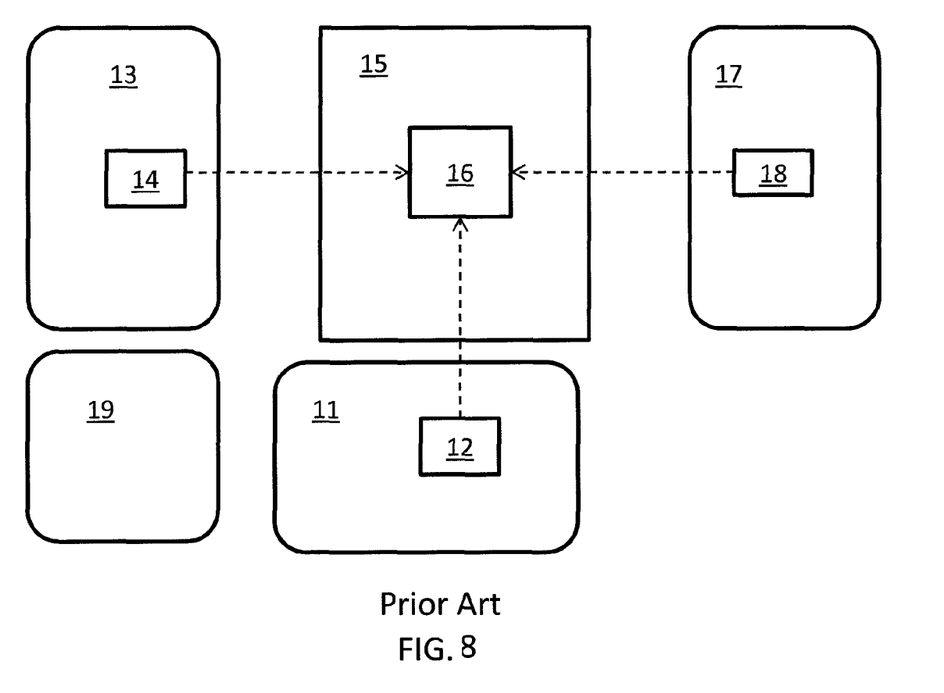
FIG. 8 is a schematic view of a configuration environment in accordance with the prior art.

Known from the article "ConfigurationDesk" in dSPACE Magazin February 2011, are a method and a configuration environment for supporting the configuration of an interface between a control system, e.g. a unit of simulation hardware, and an external device, for example a control unit. Such a method is commonly used in the area of control unit development, control unit programming, and control unit testing. Typical scenarios for the use of such methods include, for example, rapid control prototyping and hardware-in-the-loop simulations, which are shown in FIG. 5 and FIG. 6. The interaction with the configuration environment is shown in FIG. 7 and FIG. 8.

In rapid control prototyping, a control unit in the broadest sense—a development control unit, a prototyping hardware system or even a production control unit—constitutes a control system 11, and then of course comprises an electronic computing unit and an I/O device 12 associated with this computing unit, wherein this I/O device 12 need not constitute a separate item of equipment, but may form a control system 11 as a single item of equipment together with the computing unit. The I/O device 12 of the control system 11, which is to say the I/O interface of the control unit, typically has a variety of hardware functions such as digital and analog inputs, analog-to-digital and digital-to-analog converters, connections for the output of power signals, interfaces that manage specific communication protocols, or, for example diagnostic interfaces.

In the case of rapid control prototyping, the control system 11 in the form of the control unit is then connected to a technological physical process. The external device 13 here is composed of the sensors and actuators of the process, which in turn have an external interface 14 through which they—and thus indirectly the technological physical process—can be connected to the I/O device 12 of the control system 11. The I/O interface 12 of the control system 11 is configured via the configuration environment 15.

In the case of hardware-in-the-loop simulation, the control system 11 is a powerful simulation computer—electronic computing unit—with connected I/O modules—I/O device 12—and the external device 13 is a control unit or composite of control units that is to be tested in the HIL simulation, wherein the environment of the control unit is simulated by the control system 11—HIL simulator.

It is not critical which of the exemplary applications that are shown by way of example in the present case is implemented. What is critical is the fact that a substantial number of connections between the control system 11 and external device 13 or the external I/O interface 14 of the external device 13 must be established and configured, which entails substantial effort and, because of the complexity of such interfaces, can represent a significant source of error in the development process.

Using the example of a configuration of simulation hardware in the case of a hardware-in-the-loop simulation and with reference to FIG. 5, this entails the following steps, for example:

The electrical interfaces 14 of the external device 13, which is to say of the control unit to be tested in the case of a hardware-in-the-loop simulation, must be defined. Information concerning the inputs and outputs of the I/O interface 14, for example connector and pin count, is relevant for this purpose. More abstract data are also required, such as logical signal names with description, signal direction, which is to say input or output of the control unit 13, and physical signal characteristics such as voltage signal or current signal and information concerning whether a specific electrical fault is permitted to be connected to a control unit pin and what loads the control unit 13 expects at this pin. These data can be entered directly into the configuration environment 15 or can be imported through a file.

In addition, an environment model 17 must be incorporated. An environment model 17 is available as a MATLAB®/Simulink® model, for example. To link the I/O to the model 17, the configuration environment 15 provides, e.g., a Simulink library that contains interface blocks 18, known as model port blocks, for input, output, and trigger signals. These blocks 18 can be inserted in the model 17 at all model levels.

In the configuration environment 15, these components are assembled into an overall project in order to permit a configuration of the interface 12 between the control system 11 and external device 13. For example, the interfaces 14 of the at least one connected external device 13 are connected to I/O functionalities 16 of the simulation hardware, and these in turn are connected to model interfaces 18 of the environment model 17.

The I/O functions 16 initially define only what functionality is to be carried out by the simulator 11, such as PWM signal generation, regardless of the specific hardware on which this functionality is provided. In most cases, the same functionality can be provided on different hardware channels 12 or channel types.

Consequently, the required hardware channels 12 are assigned to the I/O functions 16 in another configuration step, known as hardware resource allocation.

The described sequence of steps is only one of many possible sequences. In addition, not all elements of this signal chain are absolutely necessary. Thus, information about the connected external devices 13 is not required for the actual simulation. Configuration is also possible when all that is present is I/O functions 16 and the environment model 17.

However, the prior art configuration method has the disadvantage that a great many settings at various input locations within the configuration environment 15 are necessary to create an overall configuration of the interface 12. This rapidly becomes confusing for the user, and thus error-prone.

Errors that are made during the configuration of the I/O interface 12 between the control system 11 and external device 13 also have a direct effect on the control program, which according to the method is generated automatically from—at a minimum—these data relating to the I/O configurations. The control program then controls the control system 11 in order to influence the external device 13 with the control system 11 in a planned manner, usually in real time.

SUMMARY OF THE INVENTION

It is therefore an object of the present invention to provide a method and a device that further develops the prior art.

According to an embodiment of the invention, a method for supporting the configuration of an interface 12 between a control system 11 and a device 13 to be tested via a computer-implemented configuration environment 15 is claimed, wherein the configuration environment 15 has an overview region for an overview of the state of the configuration. According to the invention, the overview region has multiple subregions, wherein at least one item of information concerning a part of the configuration is displayed in each subregion. For each subregion, an item of information about the status and/or a warning and/or an error message concerning the part of the configuration associated with the subregion is displayed. In accordance with the status, an additional configuration option for further configuration of the part is displayed so as to be selectable, and in the case of a warning and/or error message a configuration option for further configuration of the part is displayed so as to be selectable, via which the warning and/or the error message is resolved. The selection of the displayed configuration option causes a functionality to be started, via which the displayed configuration option is made possible. In the case of a change in the status of a subregion, the display of the status and/or warning and/or error message and a configuration option derived therefrom in one subregion or several subregions is automatically updated and adapted to the changed status.

An advantage of the method according to the invention is that the user has a central overview region from which he can read the steps he still needs to carry out for a complete configuration of the interface 12.

Another advantage of the method is the direct linkage of an error or warning with a suggestion for remedying the error or warning.

In another embodiment, the display in a subregion of the status and/or warning and/or error message and/or configuration option is provided via a dynamically created HTML display.

In a further development of this embodiment, the display of the status and/or warning and/or error message and/or configuration option is updated via the dynamically created HTML display.

In another embodiment, the functionality for configuration is started via a hyperlink to a selectable configuration option.

In another embodiment, the warning and/or the error itself is selected to display the selection of a configuration option via which the warning and/or the error message is resolved.

In another variant according to the invention, a change in the status of a subregion causes a subregion that was not previously displayed to be displayed in the overview region.

In a further development of the invention, each subregion is collapsible and expandable.

In another embodiment, each subregion in the collapsed state displays information as to whether warnings and/or error messages are present in the subregion.

In a further development of this embodiment, the information is displayed using icons and/or colors.

In another embodiment, the arrangement of the displayed, selectable configuration options corresponds to a defined arrangement.

In another embodiment, the warning and/or error message relates to a conflict between two conflicting entities in the configuration.

In a variant of this embodiment, different configuration options for resolving the conflict are displayed for each of the conflicting entities.

Also a subject of the invention is a configuration environment 15 with a display device for computer-assisted configuration of an interface 12 between a control system 11 and a device 13 to be tested, wherein the configuration environment 15 has a device for displaying an overview region in the display device for an overview of the state of the configuration, and the overview region has several subregions. Furthermore, the configuration environment 15 has a device for carrying out the following method steps: In each subregion, at least one item of information concerning a part of the configuration is displayed, and for each subregion an item of information about the status and/or a warning and/or an error message concerning the part of the configuration associated with the subregion is displayed. In accordance with the status, an additional configuration option for further configuration of the part is displayed so as to be selectable, and in the case of a warning and/or error message a configuration option for further configuration of the part is displayed so as to be selectable, via which the warning and/or the error message is resolved. The selection of the displayed configuration option causes a functionality to be started via which the displayed configuration option is made possible. In the case of a change in the status of a subregion, the display of the status and/or warning and/or error message and a configuration option derived therefrom in one subregion or several subregions is automatically updated and adapted to the changed status.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION

Figure 1:
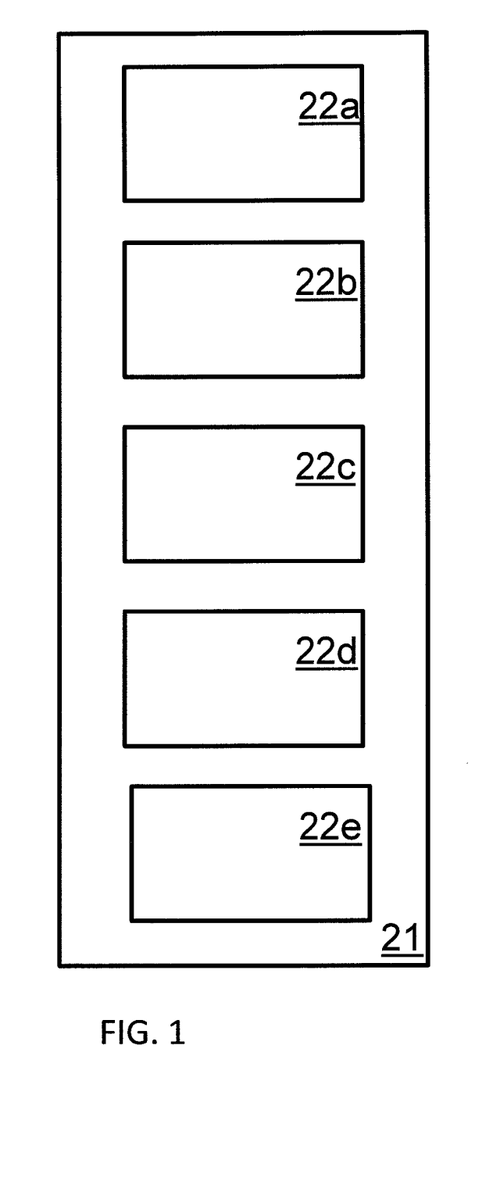
FIG. 1 is a schematic view of an overview region with subregions.
Figure 2:
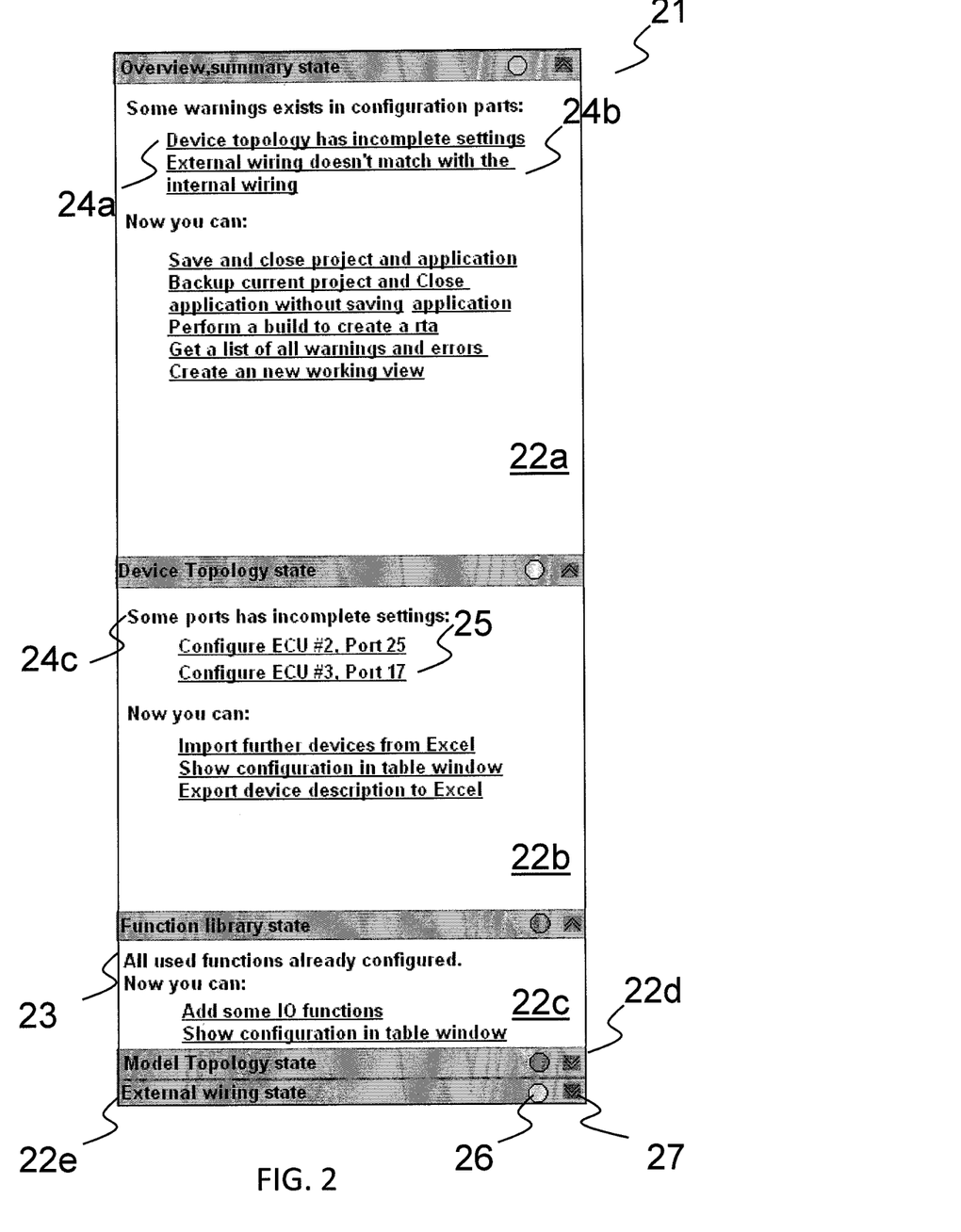
FIG. 2 is an exemplary view of an overview region with subregions.

FIG. 1 schematically shows an overview region 21 for an overview of the state of the configuration in a configuration environment, and FIG. 2 shows an overview region 21 using a concrete example. According to the invention, the overview region 21 includes several subregions 22a-22e. For example, there is a subregion 22a, which gives an overview of the overall configuration. In addition, there is a subregion 22b, which provides at least an item of information about the status and/or a warning and/or an error message concerning the description of the external device 13. A subregion 22c provides information about the configuration of the I/O functions 16. In addition, for example, there are also subregions 22d and 22e concerning the environment model 17 and the specific cable harness 19 through which the individual connections of the external device 13 are connected to the connections of the control system 11. The sequence of the subregions 22a-22e is preferably oriented toward an advantageous sequence in which a configuration is created.

Figure 3:
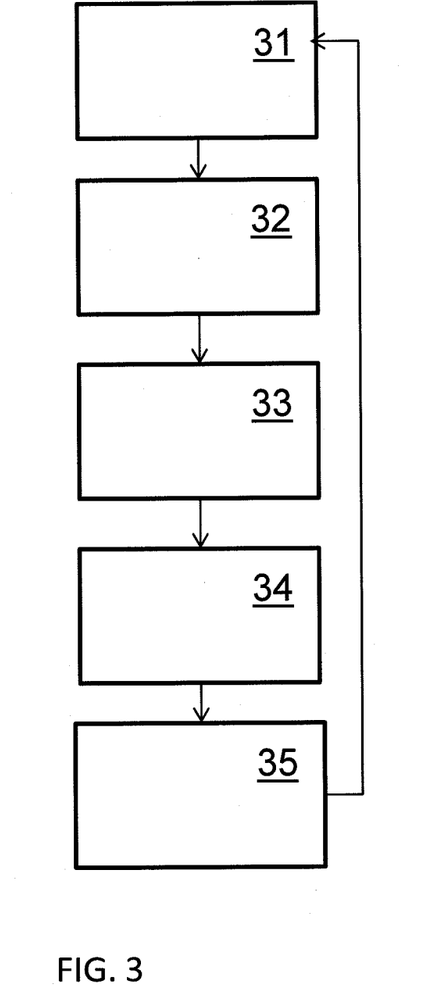
FIG. 3 is a schematic view of the method according to the invention.

FIG. 3 shows the sequence of the method according to the invention.

In a first step 31 an item of information about the status and/or a warning and/or an error message with reference to the part of the configuration associated with the subregion 22a-22e is displayed in a subregion 22a-22e, for example via a Web interface, which is to say via a dynamically created HTML display, for example.

An item of information 23 about the status provides, for example, information as to whether a configuration is already complete, or whether parts of the configuration are still missing, or whether there are still additional configuration options even though the configuration is complete. For example, I/O functions 16 are configured for all connections of the external device, but it is still possible to add additional connections to the description of the external device 13 and configure corresponding I/O functions 16 or change existing I/O functions 16. Such an item of information 23 is shown in FIG. 2 and reads "All used functions already configured," for example.

The overall status is displayed in a subregion 22a, which provides an overview of the overall configuration. Hence, if a subregion of the configuration is still incompletely configured, a warning 24a, 24b, 24c or an error provides information that the overall configuration is still not completely configured, and indicates for example the part of the configuration, which is to say the configuration unit, in which the configuration is still incomplete.

The additional subregions 22b-22e show the status only in reference to the configuration unit associated with the subregion. The status information 26 is displayed either in words or in symbols. For example, there are different symbols or colors for a complete configuration, a configuration with deficiencies that may be ignored as the circumstances require, and an incomplete or erroneous configuration. For example, based on a traffic signal, a green color is selected for a complete configuration, a yellow color for a configuration with ignorable deficiencies, and a red color for an incomplete or erroneous configuration.

A warning or an error message is displayed in a subregion 22a-22e. For example, a list is displayed of all objects that are not yet configured, are not fully configured, or are erroneously configured. An object in a configuration is, for example, a connection of the external device 13 or an I/O function 16. If necessary, for each of these objects either a warning 24a, 24b, 24c or an error message is displayed and/or a configuration option 25 for resolving the warning 24a, 24b, 24c or error message.

In another exemplary embodiment shown in FIG. 2, a warning 24a, 24b, 24c or an error message is displayed for multiple objects, and for each object a configuration option 25 via which the warning 24a, 24b, 24c or the error can be resolved.

A warning 24a, 24b, 24c is an item of information that a configuration has a deficiency, although the deficiency can be ignored depending on the application, for example, so that the configuration can be used for some applications even with the deficiency. For example, an unconfigured value of an I/O interface 14 can be populated with a default value, so that the configuration can be used in applications where this value is of no further importance. A warning 24a, 24b, 24c provides information about the type of deficiency in the configuration. In addition, the warning provides, e.g., information about the effects of the deficiency on the configuration, where in the configuration the deficiency can be resolved, and provides information about an option for resolving the deficiency.

An error is an item of information that a configuration has a deficiency such that the configuration cannot be used further in this form. For example, such an error is present in an extremely incomplete configuration or in a configuration with recognizably erroneous values. An error message provides information about, e.g., the type of error in the configuration, the effects on the configuration, where in the configuration the error can be resolved, and provides information about an option for resolving the error.

In accordance with the status, either in parallel with step 31 or in a subsequent step 32, for example during selection of a specific item of information, warning 24a, 24b, 24c, or error message, an additional configuration option 25 for further configuration of the configuration unit associated with the relevant subregion 22b-22e is displayed so as to be selectable. In the case of a warning 24a, 24b, 24c and/or error message, a configuration option 25 for further configuration of this part of the configuration is displayed so as to be selectable, via which the warning 24a, 24b, 24c and/or the error message can be resolved. The selection of the displayed configuration option 25 in a step 33 causes a functionality to be started in a step 34, via which the displayed configuration option 25 is made possible.

A corresponding configuration option 25 can be selectable via a hyperlink, for example, so that selecting the hyperlink opens a corresponding window for configuration and the functionality for configuration is started. Preferably, each entry that can be selected in this way is given the appearance of a hyperlink. In another variant implementation, the configuration option is selected via a checkbox.

In the case of a change in the status of a subregion 22a-22e, the display of the status 23 and/or warning 24a, 24b, 24c and/or error message and a configuration option 25 derived therefrom in one subregion 22a-22e or several subregions 22a-22e is automatically updated and adapted to the changed status in a step 35. This is accomplished through, e.g., a dynamically created HTML display, which is updated based on corresponding events. If necessary, the updating of the subregions 22a-22e in one embodiment causes a previously undisplayed subregion to be displayed in the overview region 21 in step 31.

Furthermore, the user can define his own items of information 23, warnings 24a, 24b, 24c, and errors, which are displayed to him when the corresponding condition of the configuration is present. In addition, the user can also define the possible proposed solutions and configuration options 25.

The overview region 21 is continuously displayed in a defined region within the working area of the configuration environment 15, for example. In this design, the size of the overview region 21 is preferably changeable, and, in particular, can be stored. The overview region 21 can also be closed, but preferably is displayed again when the configuration environment 15 is restarted. This behavior is configurable, in particular.

In a further development of the invention, each subregion 22a-22e is collapsible and expandable independently of the state of the other subregions 22a-22e. For example, a selection is made via a symbol 27 as to whether the subregion 22a-22e is displayed in full or only a short summary is displayed. In another embodiment, each subregion 22a-22e in the collapsed state displays information as to whether warnings and/or error messages are present in the subregion 22a-22e. This is done, for example, by using different symbols, icons, or colors for a complete configuration, a warning, or an error message in the subregion 22a-22e.

The size of a subregion 22a-22e preferably adapts itself dynamically to the displayed content, so that the subregion 22a-22e is larger for long lists of information than when fewer items of information are displayed, for example.

Preferably, the individual subregions 22a-22e do not contain a fixed structure with regard to the information displayed, but instead display the relevant information adapted to the current status. Thus, for example, aside from the possible subregions neither the specific information nor its structure is defined. Preferably, a subregion 22a-22e includes an RTF editor or a Web explorer frame. Thus, for example, for each subregion 22a-22e the requisite data are prepared, and updated as needed, via Web interface, which is to say via a dynamically created HTML display, for example.

Such provision of the information takes place via events, for example. After each configuration action of the user or the loading of a part of the configuration, an event corresponding to the action or the loading is generated. Technically, there are thus different types of events; on the one hand there are work-flow-related events, on the other hand there are action-driven events. Work-flow-driven events relate to the loading of configuration units and the completeness of the configuration.

Triggered by an event that relates to the loading of a configuration unit, the configuration environment provides feedback on as-yet-unloaded units and offers the option to load them. Such feedback includes, e.g., information that the description for the external device 13 is missing and the option to add such a description. With regard to the I/O functions 16, the option to create a new I/O function 16 or assume a preconfigured I/O function 16 is offered. With regard to the control system 11, for example, a set of simulation hardware can be created or an already-created set of simulation hardware can be used for this configuration. In addition, an environment model 17 can be created or loaded.

Other work-flow-driven events relate to the completeness of the configuration. In accordance with these events, information, warnings, and errors are displayed, which provide information concerning the places which still must be configured and offer the configuration options for this purpose.

Action-driven events are triggered by incorrectly configured parameters and violation of defined value ranges, for example, or when connections have been made incorrectly.

An event informs the system about the state of the configuration. Based on this information, the displayed items of information are checked, information no longer matching the state of the configuration is no longer displayed, and if applicable new information, warnings, and error messages resulting from the new state of the configuration are displayed with corresponding configuration options. From within every subregion 22a-22e, one of the configuration options displayed in the subregion 22a-22e can be started at any desired time.

In a different implementation, the state of the configuration is queried by the system, for example at regular time intervals.

Possible expressions of the invention are explained below by way of example using a hardware-in-the-loop configuration.

In the configuration environment 15, the list of functionalities appears in the topmost section.

The user sees the proposed steps: (1) Create a project including defining the name; and (2) Create a configuration of a selectable type.

In each case the entry, which actually is also selectable, can be called up directly in the corresponding subregion 22a-22e. The same is true when multiple entries are selectable at the same time.

Once the configuration is created, this region moves downward. Now a region is inserted above it that contains the allocation of the configuration units and information about the individual configuration units.

As soon as the user has added a configuration unit to the configuration application, a separate subregion 22a-22e for it appears above the current subregion 22a-22e. Preferably, the sequence of the display of the subregions 22a-22e is defined.

During processing of the configuration, the following information appears by way of example in the subregions 22b-22d:

Displayed in the subregion 22b for the external device 13 is that a description must be added for the external device 13 of the overall configuration. To this end, the option of manually creating such a description is offered. Another option for adding the description is importing it from a file, for example. If the user chooses this option, this leads to an import process via a selection dialog. Still another option for adding the description is loading it from a different configuration, for example. An option for starting the loading process via a selection dialog is stored here as well.

In addition, information concerning configuration of the external device 13 is displayed in the subregion 22b. This includes the creation of a connection, with selection of this information starting a corresponding call. Furthermore, configuration options for the connections are offered. For example, this may take the form of a list of the connections that are not yet used, a list of the connections that do not yet have an error configuration, a list of the connections that do not yet have a load configured, and a list of the connections that are not yet connected to an I/O function 16.

Examples of warnings are warnings that not every displayed connection has been allocated a pin, not every connection has a reference connection, and not every connection has been assigned a type. If such an information item is selected, then an item of information concerning the cause is displayed and a configuration option is offered via which the problem can be resolved.

Warnings and error messages concerning a configuration relate to aspects including conflicts in a configuration, which is to say inconsistencies in the configuration. In the event of a conflict, both the conflict and the applicable conflicting entities are displayed. Furthermore, a conflict is assigned to a conflict category, for example. In addition, information is displayed as to what processes the conflict is detrimental to. For example, a conflict can be a problem for the concrete configuration of the control system 11, but the calculation of the cable harness 19, which is to say what connection of the external device 13 should be connected to what connection of the control system 11, is possible in spite of the conflict. The user is thus given the option of deciding whether and how he wishes to resolve the conflict in order to be able to execute his desired use case.

Figure 4:
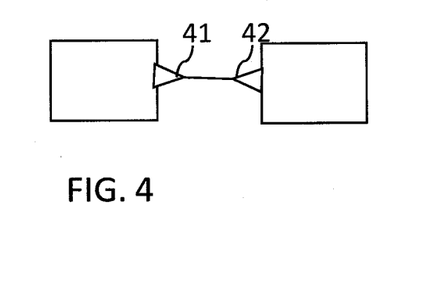
FIG. 4 is a schematic view of a conflict in the configuration.

When there are multiple options for resolving the conflict, for example depending on the conflicting entity at which the configuration is changed, the individual options for resolution are displayed with reference to the conflicting entities. This is explained using FIG. 4. FIG. 4 shows that the two signal inputs 41 and 42, for example of an external device 13 and of a simulation hardware unit 11, are connected to one another even though an input should always be connected to an output. From the perspective of the signal input 41, this means that the input 42 would have to be changed to an output or the input 41 would have to be connected to a different output. From the perspective of the input 42, this means that the input 41 would have to be changed to an output or the input 42 would have to be connected to a different output. Both of these resolution options should be offered to the user as configuration options 25, and in advantageous manner the consequences for the overall configuration should be displayed.

Conflicts are resolved directly through the display of the conflict in that options for settings that resolve the conflict are displayed—along with the conflict—with reference to the conflicting entities and a corresponding function can be started through selection of the configuration option 25.

In like manner, a different representation of the conflict that displays the conflicting entities in context can be opened from within the display of the conflict. In this way, the user can examine the conflict with reference to the context and decide how the conflict should be resolved.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for supporting a configuration of an interface via a computer-implemented configuration environment for the configuration of an interface between a control system and an external device, the configuration environment having an overview region for an overview of the state of the configuration, the overview region having several subregions provided therein, the method comprising:
displaying the overview region in a portion of a working area of the configuration environment;
displaying, in each subregion within the overview region, at least one item of information relating to a part of the configuration that is provided in each subregion, respectively;
displaying, in each subregion within the overview region, an item of information about a status and/or a warning and/or an error message relating to the part of the configuration associated with the subregion, such that the item of information about a status and/or a warning and/or an error message is displayed in each subregion simultaneously;
displaying, in a respective subregion within the overview region in accordance with the status, an additional configuration option for further configuration of the part so as to be selectable;
displaying, in a respective subregion within the overview region in the case of a warning and/or error message, a configuration option for further configuration of the part so as to be selectable, via which the warning and/or the error message is resolved;
initiating a functionality based on the selection of the displayed configuration option, via which the displayed configuration option is made possible; and
automatically updating and adapting, in the case of a change in the status of a subregion, the display of the status and/or warning and/or error message and a configuration option derived therefrom in one subregion or several subregions to the changed status,
wherein at least one item of information of the configuration includes information of I/O functions configured for connections of the external device,
wherein the external device is comprised of sensors and actuators of a physical process in a rapid control prototyping scenario, and
wherein the I/O functions define functionality to be carried out by the rapid control prototyping, and wherein the functionality is at least one of digital input/output, analog input/output, analog-to-digital converter, digital-to-analog converter, connection for the output of power signals or an interface that manages communication protocols, or diagnostic interfaces.

2. The method according to claim 1, wherein the display in a subregion of the status and/or warning and/or error message and/or configuration option is provided via a dynamically created HTML display.

3. The method according to claim 2, wherein the display of the status and/or warning and/or error message and/or configuration option is updated via the dynamically created HTML display.

4. The method according to claim 1, wherein the functionality for configuration is started via a hyperlink to a selectable configuration option.

5. The method according to claim 1, wherein the warning and/or the error itself is selected to display the selection of a configuration option via which the warning and/or the error message is resolved.

6. The method according to claim 1, wherein a change in the status of a subregion causes a subregion that was not previously displayed to be displayed in the overview region.

7. The method according to claim 1, wherein each subregion is collapsible and expandable.

8. The method according to claim 7, wherein each subregion in the collapsed state displays information as to whether warnings and/or error messages are present in the subregion.

9. The method according to claim 8, wherein the information is displayed using icons and/or colors.

10. The method according to claim 1, wherein the arrangement of the displayed, selectable configuration options corresponds to a defined arrangement.

11. The method according to claim 1, wherein the warning and/or error message relates to a conflict between two conflicting entities in the configuration.

12. The method according to claim 11, wherein different configuration options are displayed for each of the conflicting entities.

13. The method according to claim 1, wherein the entire overview region is displayed in the portion of the working area.

14. The method according to claim 1, wherein the overview region is formed as a column that includes the subregions listed within the column.

15. The method according to claim 1, wherein a first subregion out of the subregions within the overview region provides an overall status of all other subregions within the overview region.

16. The method according to claim 1, wherein the overview region is continuously displayed in the portion of the working area of the configuration environment from a point when the configuration environment is started.

17. A configuration device comprising:
a display device for computer-assisted configuration of an interface between a control system and an external device; and
a component for displaying an overview region in a portion of a working area of the display device for an overview of a state of the configuration, the overview region having a plurality of subregions provided therein;
wherein the configuration device is configured to perform the steps of:
displaying the overview region in the portion of the working area of the display device;
displaying, in each subregion within the overview region, at least one item of information relating to a part of the configuration that is provided in each subregion, respectively;
displaying, in each subregion within the overview region, an item of information about a status and/or a warning and/or an error message relating to the part of the configuration associated with the subregion, such that the item of information about a status and/or a warning and/or an error message is displayed in each subregion simultaneously;
displaying, in a respective subregion within the overview region in accordance with the status, an additional configuration option for further configuration of the part so as to be selectable;
displaying, in a respective subregion within the overview region in the case of a warning and/or error message, a configuration option for further configuration of the part so as to be selectable, via which the warning and/or the error message is resolved;
causing a functionality to be started via the selection of the displayed configuration option, via which the displayed configuration option is made possible; and
automatically updating and adapting, in the case of a change in the status of a subregion, the display of the status and/or warning and/or error message and a configuration option derived therefrom in one subregion or several subregions to the changed status,
wherein at least one item of information of the configuration includes information of I/O functions configured for connections of the external device,
wherein the external device is comprised of sensors and actuators of a physical process in a rapid control prototyping scenario, and
wherein the I/O functions define functionality to be carried out by the rapid control prototyping, and wherein the functionality is at least one of digital input/output, analog input/output, analog-to-digital converter, digital-to-analog converter, connection for the output of power signals or an interface that manages communication protocols, or diagnostic interfaces.

18. The configuration device according to claim 17, wherein the entire overview region is displayed in the portion of the working area.

19. The configuration device according to claim 17, wherein the overview region is formed as a column that includes the subregions listed within the column.

20. The configuration according to claim 17, wherein a first subregion out of the subregions within the overview region provides an overall status of all other subregions within the overview region.

* * * * *